June 3, 1958  G. DAVENPORT  2,837,010
DUOLINEAL-FEED HOBBING MACHINE
Filed Jan. 21, 1955  5 Sheets-Sheet 1

INVENTOR.
GRANGER DAVENPORT
BY
*Harold F. Smith*
ATTORNEY

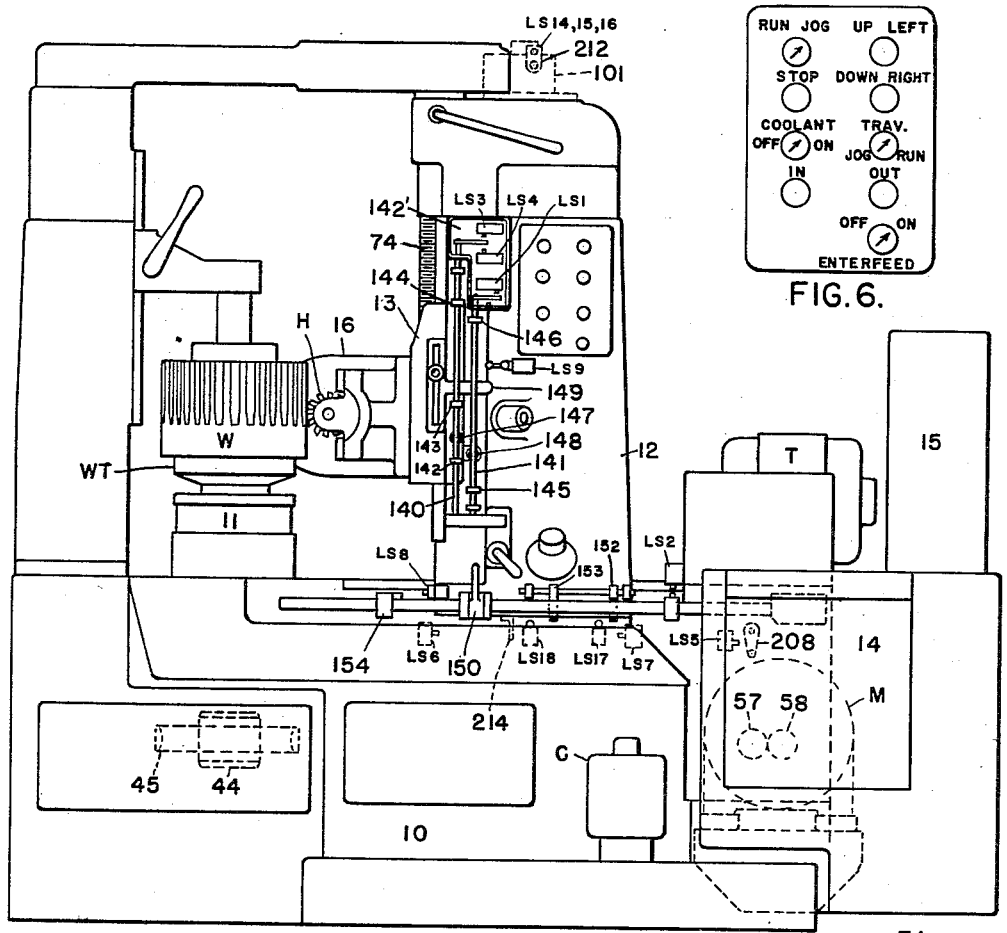
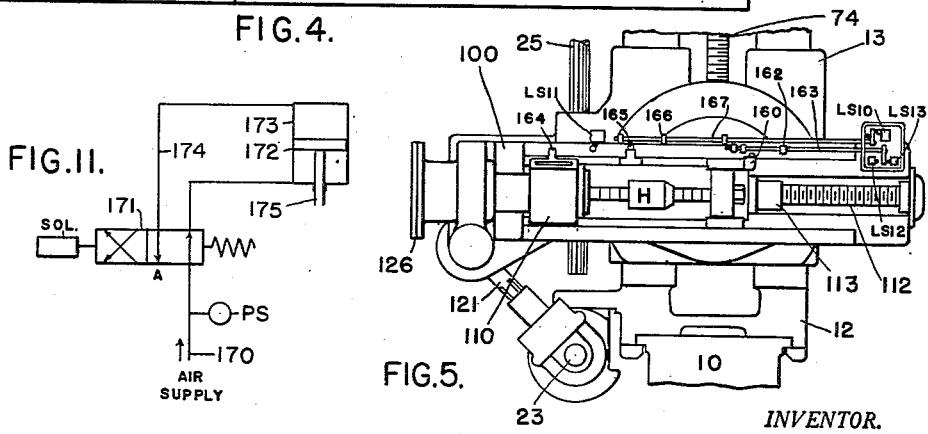

June 3, 1958 G. DAVENPORT 2,837,010
DUOLINEAL-FEED HOBBING MACHINE
Filed Jan. 21, 1955 5 Sheets-Sheet 3

INVENTOR.
GRANGER DAVENPORT
BY
Harold F. Seidman
ATTORNEY

June 3, 1958 G. DAVENPORT 2,837,010
DUOLINEAL-FEED HOBBING MACHINE
Filed Jan. 21, 1955 5 Sheets-Sheet 4
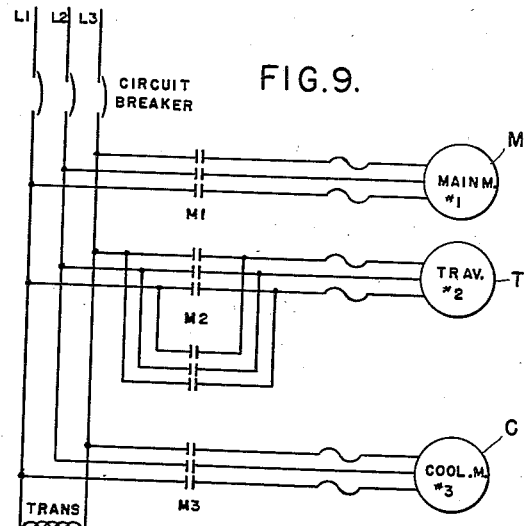
FIG. 9.
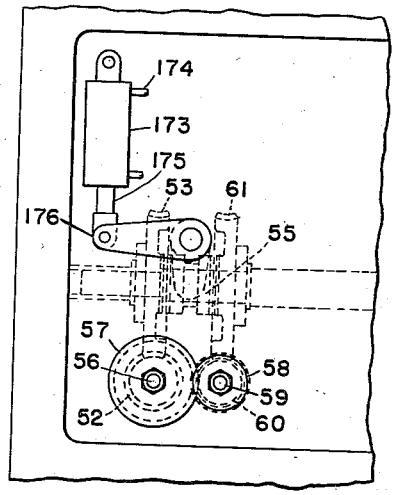
FIG. 8.
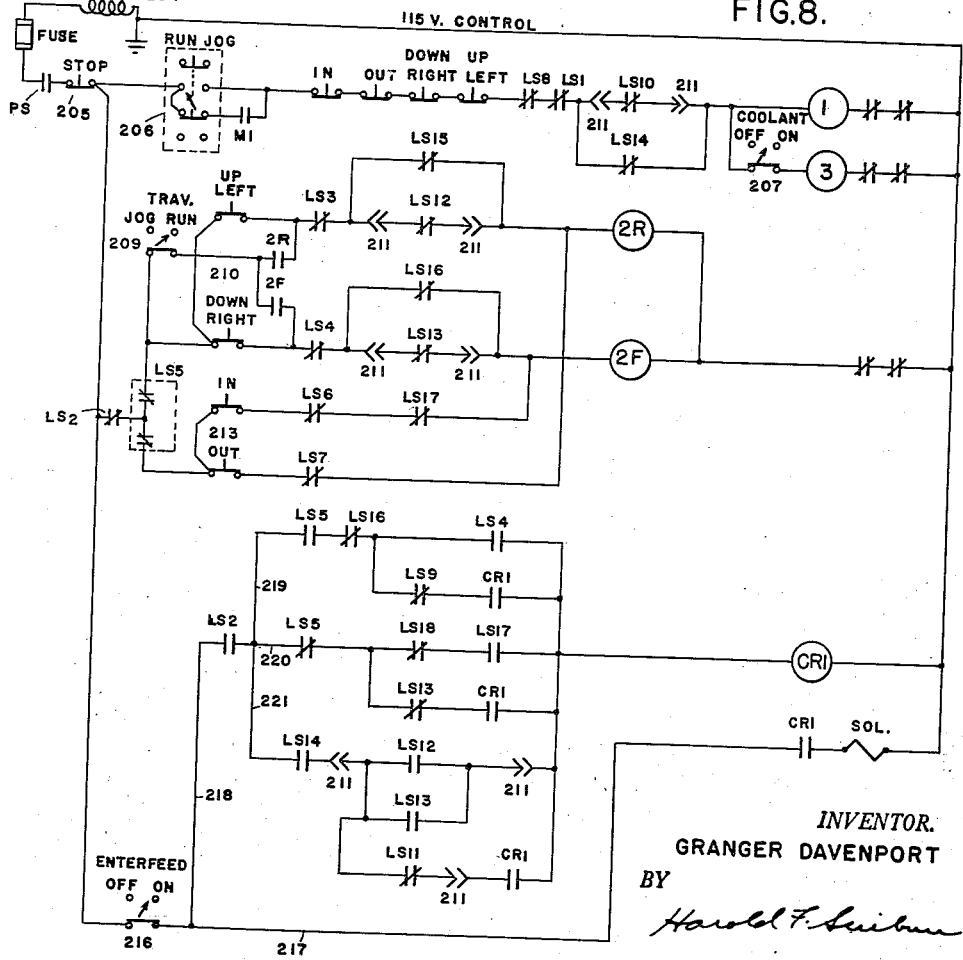
INVENTOR.
GRANGER DAVENPORT
BY
Harold F. Seidman
ATTORNEY June 3, 1958 G. DAVENPORT 2,837,010
DUOLINEAL-FEED HOBBING MACHINE
Filed Jan. 21, 1955 5 Sheets-Sheet 5

INVENTOR.
GRANGER DAVENPORT
BY
Harold F. Scribner
ATTORNEY

United States Patent Office 2,837,010
Patented June 3, 1958

2,837,010

DUOLINEAL-FEED HOBBING MACHINE

Granger Davenport, Montclair, N. J., assignor to Gould & Eberhardt, Incorporated, Irvington, N. J., a corporation of New Jersey Application January 21, 1955, Serial No. 483,405

11 Claims. (Cl. 90—4)

The present invention relates to improvements in machine tools, more especially gear-hobbing machines, and is concerned particularly with improvements in the feed transmissions by the aid of which important and worthwhile savings in the unit rate of production of a single gear or a run of gears may be realized.

In the cutting of gear teeth in a blank, whether the process is one of hobbing using a worm type of cutter or one of gear cutting using a form milling cutter, it is customary to mount the work on a spindle and set the cutting tool to the tooth depth desired and engage the feed. Some machines are equipped with a power-traverse train whereby the approach of the hob to the blank is made more quickly, but before the work is engaged the rapid traverse is tripped out and the normal feed is tripped in.

However, in all hobbing machines there is a very appreciable loss or waste of time by virtue of the fact that when a tool such as a hob initially contacts the work, only the very tips of the teeth nick the blank. This nicking operation continues all the way around the blank before the hob has been fed an appreciable distance axially of the blank. And since, as in hobbing, the nicking of the blank continues in a helical path of closely spaced convolutions around the blank, many revolutions of the blank are made before the hob is cutting full depth. The rotary motions of the work and the hob, as well as the rate of feed per revolution of the work, are ordinarily whatever the machine has been constructed to stand with due regard to the cutting properties and characteristics of the material of the blank and the quality of finish required on the profile of the gear teeth. It will be seen, therefore, that while the hob has entered the work but has not reached its full cutting depth and work load, the machine is functioning in an efficient and costly manner, and prior to this invention the machine operator could do nothing about it because the driving transmissions, feed, speed, and index movements of the machine are timed and driven in a fixed ratio and were already driven at capacity.

In an effort to reduce the entering time, some machines have been equipped with means for feeding the cutter radially of the blank to the tooth depth desired, after which the radial feed was discontinued and an axial feed instituted. A rectangular feed cycle of this character has the objection that during the infeed the cutter-supporting stanchion or its equivalent in a movable work support, must necessarily remain unclamped and the reacting tooling forces are difficult to absorb without undue vibration. A further objection is the additional complicated mechanism to stop the infeed accurately at the desired center distance.

A primary purpose of this invention is to utilize the entering time to better advantage in the hobbing of gears to the end of measurably increasing the overall productive capacity of the machine. The invention further aims to render available a hobbing machine embodying two or more selectively available rates of feed in a single direction as distinguished from a traverse movement followed by a feed movement which does not solve the problem here involved, or movements in two transverse directions (rectangular cycle) which does not offer the most economical solution to the instant problem.

For purposes of description the invention will be explained more fully in connection with hobbing machines which characteristically embody a prime mover and three transmissions driven therefrom, namely, tool-rotating, work-rotating, said tool-or-work feed transmissions, all geared together so that the final elements run synchronously in definite ratio. Currently hobbing machines fall into two general classes (a) nondifferential and (b) differential machines, either of which may be employed to cut spur or helical gears when the proper change gears are installed. In regular nondifferential machines a main motor delivers to a change gear means and the output thereof drives the hob. Ahead of the hob a branching train delivers to an index change-gear means and the output from the latter drives the work spindle. Hob rotations and work rotations are, therefore, always synchronized. Ahead of the work spindle a subbranch transmission leading to feed-change means is taken off and the output thereof drives the feed train which effects relative movement between the rotating hob and the rotating work.

Such a machine may be used for cutting either spur or helical gears, but if the latter, the necessary lead increment for the helix angle must be added to the calculations involved in selecting the work-index change gears.

In the regular differential hobbers a differential unit is incorporated ahead of the work-index change gears in the branch transmission leading to the work spindle and an operative connection from the feed train operates on the differential-unit housing to give it an additive or subtractive motion proportioned with the feed to obtain the helical lead. Customarily change-gear means for lead is incorporated in the connections to the differential unit housing to obtain the lead increment independent of the work rotation change gears.

In both the regular differential and nondifferential machines it is also customary practice to provide a rapid-traverse train to drive the feed screw at traverse rate so as to bring the tool and the work quickly to the approximate position for tooling. Clutches are incorporated in the feed train and in the traverse train operable to disengage the feed when the traverse is engaged and to disengage traverse when the feed is engaged. Operation of the clutches may be effected manually or automatically either before or after completion of the actual tooling operation but not during the cut which is always performed with the feed transmission operating at the preselected feed rate. Needless to say actual tooling operations are never performed with the rapid traverse transmission.

Also, both of these regular types of machines (differential and nondifferential) may be used to cut either spur or helical gears. Because of the feed is axial when cutting spur gears it is possible by suitable means to vary the feed rate during the cut. When cutting helical gears differentially it is also possible by suitable means to vary the feed rate during the cut because the lead increment imposed on the work-index transmission through the differential unit operates to maintain the index-feed ratio invariable regardless of feed rate. However, with regular nondifferential machines setup for cutting helicals only one feed may be employed for any one combination of change gears because in such machines the lead-increment calculations are included in the work-index calculations and once the proper gearing is installed for the particular helical gear to be cut, the feed may not be changed (without ruining the gear or badly damaging the hob) and for all practical purposes only one feed rate in a nondifferential machine is all that can be used in hobbing a given helical gear.

Machines similar to the basic machine explained above may also be used for infeed or tangential-feed hobbing but modified to the extent of having a duolineal feed take place radially of the blank or tangentially of the blank instead of axially of the blank.

The present invention concerns primarily the basic nondifferential and differential machines and as a main objective undertakes to render available in such machines two or more electively available rates of feed in a single direction so constructed and related as to be adaptable for automatic operation to the end of making it possible for the operator to set up the machine to produce automatically a rapid traverse of the hob toward or away from the work—then a first tooling feed (enterfeed) while the hob is entering the work—and then a second tool feed (the normal feed) after the hob has reached full cutting depth and about to produce the fully formed teeth, all in the one and the same direction, the end result in view being to reduce inefficient penetrating-to-depth time to the very minimum.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts through out all the views, of which:

Fig. 4 of the drawings is an elevational view of a typical hobbing machine embodying this invention.

Fig. 5 is a view of a portion of the machine of Fig. 4 and in which the hob-swivel head has been replaced by a wormgear tangential cutter head for cutting wormgears.

Fig. 6 is a detail view of the pushbutton control panel for the machine.

Figure 7:
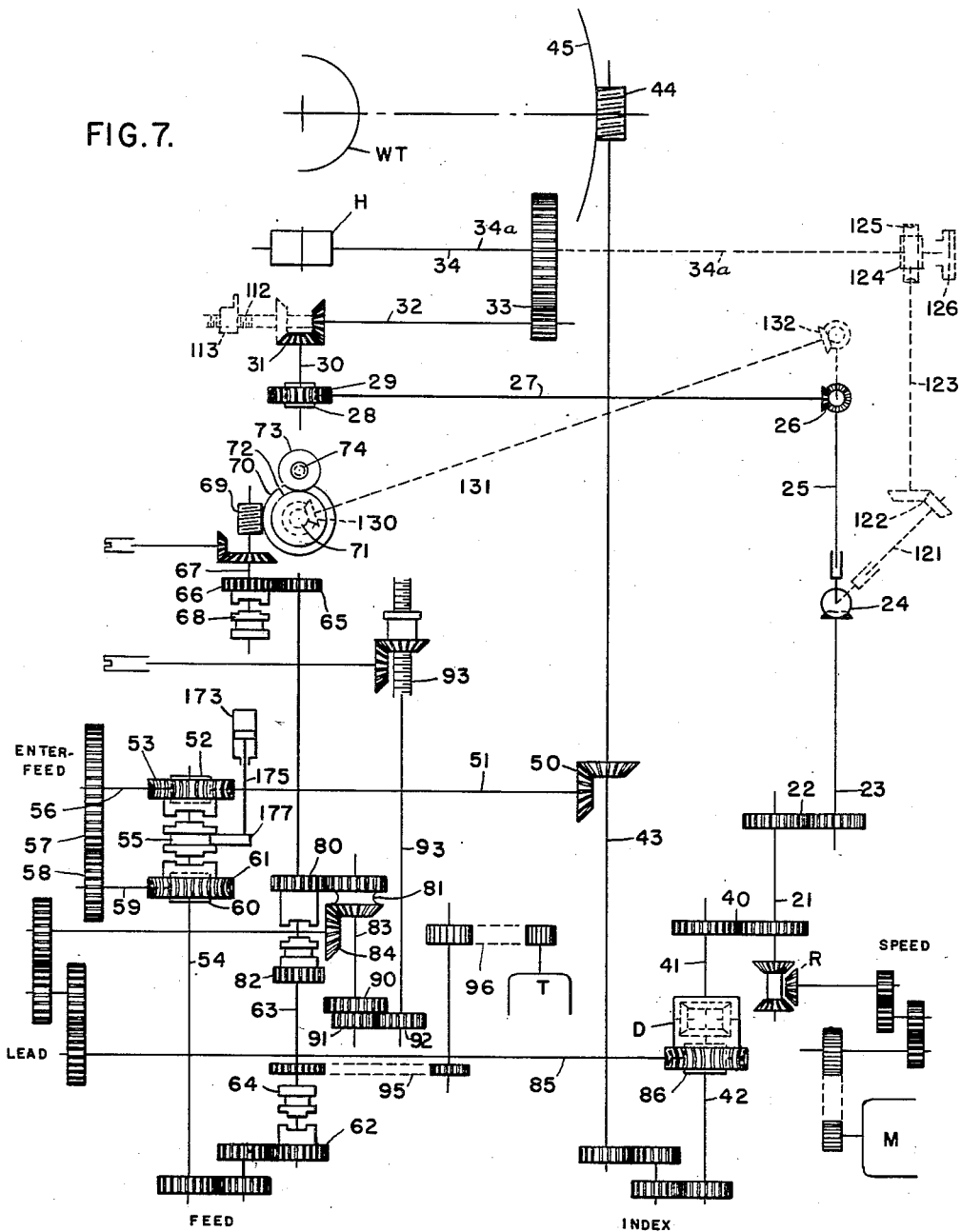

Fig. 7 is a line diagram of the gearing, in developed form, of a hobbing machine and including the gear trains (shown in dotted line) that are used when the tangential-feed head is applied to the machine.

Fig. 8 is a detail view of a portion of the gear case illustrating the wormgear feed clutch by which entering and normal cutting feed rates may be obtained.

Fig. 9 is an elementary diagram of the control circuits.

Figure 10:
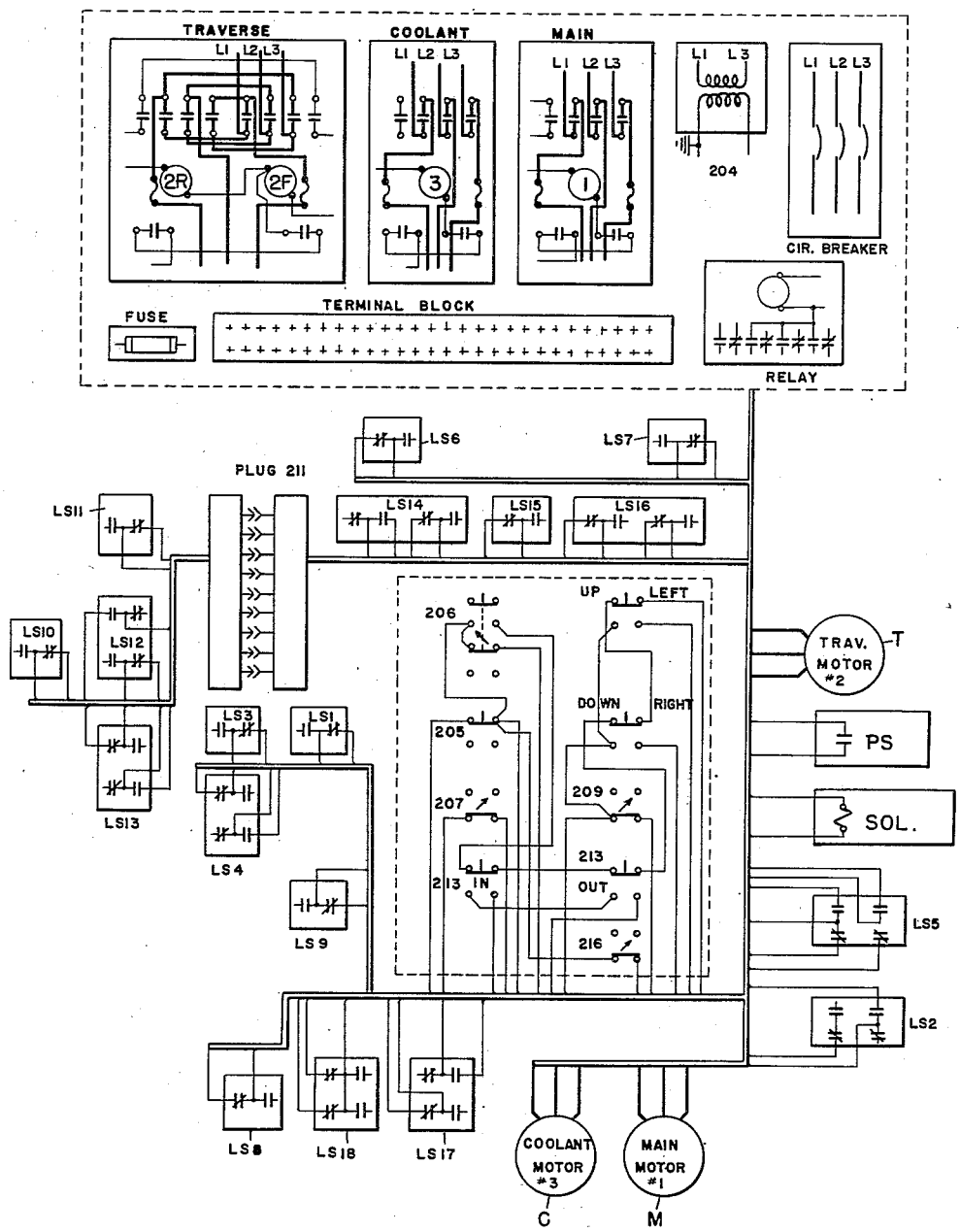

Fig. 10 is a wiring diagram of the electrical circuits and controls for the machine.

Fig. 11 is a line diagram of a solenoid-operated valve and the fluid circuit of the two-feed clutch-shifting cylinder.

Referring more particularly to the drawings a representative hobbing machine is illustrated in Fig. 4. Such a machine comprises, ordinarily, a main base 10 that provides bearings for a work table 11 and portions of the driving transmissions, and a stanchion 12 that is movable toward and away from the work table. The stanchion 12 furnishes support for a vertically adjustable hob-swivel-head carriage 13. A main gear case 14 and control cabinet section 15 located at the rear of the main frame contains most of the gearing illustrated in Fig. 7 and the electrical control equipment depicted in Figs. 9 and 10.

In Fig. 4 the character W indicates a work blank and H a hob in tooling relation. In this instance the hob is well into the work rotating and feeding downwardly, as the work is revolving in timed relation.

In its broader aspects the transmissions for driving the work, hob, and hob-feed trains are similar to the constructions disclosed in the patents to Zimmermann No. 2,374,254 and No. 2,690,701, but the present transmissions and the controls therefor differ fundamentally from the structures of said patents in that the present invention proposes to provide an entering feed in addition to the normal feed, both operating successively in a single direction, and while the hob and work are in cutting relation generating teeth on the gear.

The gearing for the exemplified hobber is shown diagrammatically in Fig. 7 wherein a main drive motor M delivers power to a bank of speed-change gears indicated Speed on the drawing, from which motion is transmitted through a reverser R to a horizontal shaft 21. Gears 22 transmit the motion to another horizontal shaft 23 which which extends toward the work table WT and is splined at its forward end to mount a translatable set of bevel gears 24 at the lower end of a disconnectible vertical shaft 25. The upper end of the vertical shaft 25 is also splined and mounts a pair of bevel gears 26 by which power is delivered to a shaft 27 that is journaled in the hob carriage 13. Shaft 27 carries a worm 28 that drives wormgear 29 on shaft 30 at the swivel axis of the hob swivel head 16. Shaft 30 drives a pair of bevel gears 31 which in turn drives shaft 32, and the latter through gears 33 drives the hob spindle 34 and hob H.

A branch transmission, deriving power from the shaft 21 drives the work table WT as follows: gears 40 connect shaft 21 with shaft 41 and the latter operating through a differential unit D drives shaft 42. A bank of change gears marked Index on the drawing transmit the power to a shaft 43 which drives a worm 44 and work-table index wormgear 45. Wormgear 45 drives the work table 11 and work fixture WT and workpiece W that may be mounted thereon. In a nondifferential hobbing machine, the differential unit D is omitted and shafts 41 and 42 are as one whereby the work table is caused to revolve in timed relation with the revolutions of the hob. However, when a differential unit is embodied in the gear train and the machine is set up for cutting helical gears it becomes possible to change feed rate of the hob during the cut without losing lead (ratio between work-motion increment and feed increment determined by the helix angle) because of a back-driving connection between the feed transmission and the housing of the differential unit as will be explained.

In the instant embodiment the feed motion is taken from the work-table drive shaft 43 by bevel gears 50 which deliver power to a worm shaft 51 and worm 52 thereon. Worm 52 meshes with wormgear 53 which is free on a shaft 54 unless clutched thereto by the shifting of a clutch spool 55, the latter being keyed to shaft 54. Shaft 51 continues as shaft 56 past the worm 52 and drives change gears 57 and 58 the latter driving a second worm shaft 59 and a worm 60 thereon. The worm 60 meshes with a wormgear 61, also free on shaft 54 unless clutched thereto by oppositely shifting of the clutch spool 55. In accordance with this invention two different feeds, electively available, may be imparted to shaft 54 from the one speed of shaft 51, and which may be obtained, for example, by having the worm and gear sets 52, 53 and 60, 61 of different ratio, as by multiple or single thread or different numbers of teeth. The change gears 57 and 58 are provided so that the fixed ratios of the wormgear sets may be relatively modified to suit the feed-rate difference desired between the enterfeed and the normal feed. However, the feed-rate motion that is imparted to shaft 54 is delivered to a bank of feed-change gears marked Feed the final gear of which is a clutch gear 62 that is free on a shaft 63. If clutch spool 64 is engaged with the gear 62, shaft 63 is driven at the selected feed rate and power is conducted forward to a pair of gears 65, 66, the latter being free on a parallel shaft 67 and adapted to be clutched thereto by clutch spool 68. If the clutch spool 68 is engaged with the gear 66, shaft 67 is rotated and drives a worm 69 that meshes with a wormgear 70 on a vertical shaft 71. The top of shaft 71 drives a spur gear 72 and the latter a gear 73 on a hob-carriage feed screw 74. The carriage-feed nut (not shown) is secured to the carriage 13 as will be understood.

The back connection to the differential unit, previously referred to, derives power from feed shaft 63 by gears 80 and 81 of which gear 80 is free on the shaft 63 except when clutched fast by a shiftable clutch spool 82. A combination gear 81 which idles on shaft 83, drives bevel gear 84 and lead change gears, marked Lead, the final gear of which drives worm shaft 85. A worm 86 on the shaft 85 drives the housing of the differential unit D. Thus by shifting clutch spool 82 into engagement with gear 80 the lead gearing functions to add or subtract the necessary increment to the index motion, whereas, by shifting the clutch spool out of engagement with the gear 80, the lead gearing becomes ineffective and the differential housing is locked.

When the clutch spool is shifted further to its third position a drive is established from gear 82 to gears 90 and 91 idling on shaft 83, the meshing gear 92 being secured to an infeed screw shaft 93. Screw shaft 93 threads through a nut carried by the stanchion and by which the stanchion may be moved radially of the work table 11 by power at an enterfeed rate or at the normal feed rate depending upon the position of the duolineal feed clutch spool 55. When the power feed clutch spool 64 is disengaged from feed gear 62, the feed shaft 63 may be operated at a rapid rate by means of the chain and sprocket drives 95 and 96 that transmit highspeed motion from an auxiliary traverse motor T. The controls for the traverse motor T and the traverse clutch are electrically interlocked to prevent incompatible operations.

In accordance with this invention of providing two selectively available duolineal cutting feeds in addition to a traverse movement and/or manual movement of the hob carriage, provision may be made for hobbing wormgears by either tangential or infeeding the hob at an enterfeed rate followed by the normal feed utilizing for this added function the same dual-feed wormgear sets 52, 53 and 60, 61 and a substantial portion of the basic speed, index, feed, and lead transmissions herein described. Fig. 5 illustrates a portion of the hobbing machine of Fig. 4 but having a tangential feed head 100 mounted on the carriage 13 for wormgear cutters instead of the conventional hob swivel head 16 of Fig. 4 that is used for hobbing spur and helical gears. To effect a change over from spur or helical-gear hobbing to wormgear hobbing utilizing tangential feed, the hob-swivel head 16 is removed from the carriage 13 and a tangential-feed wormgear cutting head 100 is mounted in its place. Such a change over is illustrated in Fig. 5 in which 100 is the tangential-feed head that provides guideways for a horizontally movable hob slide 110. The slide 110 journals a hob spindle that mounts a hob H and is arranged to be fed laterally by means of a feed screw 112 operating through a nut 113 carried by the slide 110.

The tangential-feed transmission elements have been included in Fig. 7 more clearly to depict the relation thereof to the dual-feed gearing (52—61) which is available when the machine is set up for tangential feeding as well as when set up for axial feeding and for infeeding. Referring more particularly to the upper portions of Fig. 7, the hob drive is taken from the shaft 23 by means of bevel gears 24. These gears are uncoupled from vertical shaft 25 and coupled with shaft 121. A second set of bevel gears 122 transmit the power from shaft 121 to a worm shaft 123 journaled in the tangential feed head, and a worm 124 thereon drives wormgear 125.

The wormgear 125 drives the hob spindle 34a through a set of hob-index plates 126. It will be understood that the gears 33 and shaft 32 illustrated in Fig. 7 are journaled in the hob-swivel head 16 and are removed with the swivel head and should, therefore, be disregarded in considering Fig. 7 in relation to tangential feeding. Likewise, when using the tangential-feed head vertical shaft 25 is uncoupled at its lower end from gears 24 and shaft 23 so that the transmission parts embracing members 121 through 126 become effective. And it will also be understood that when the tangential-feed head is removed the gearing 121 through 126 is removed with it and shafts 23 and 25 recoupled.

The tangential-feed movement is imparted to the hob slide of Fig. 5 by taking power from the top of the vertical shaft 71, by means of bevel gears 130, and shaft 131, and another set of bevel gears 132 at the top of the uncoupled shaft 25. Feed power thus transmitted to shaft 25 is transmitted as before through bevel gears 26, shaft 27, worm and wormgear 28, 29 to shaft 30 and bevel gear 31 at the swivel axis of the carriage 13. The tangential-feed head carries on its feed screw 112 the mate to bevel gear 31, and when the head is mounted on the carriage the bevel gears mesh and a feed drive is established to the feed screw 112. The screw 112 threads through the nut 113 secured to the tangential-feed slide 110. Thus the universal hobbing machine forming the subject of this invention embodies duolineal feeds that are common to built-in trains and attachments for spur-gear hobbing nondifferentially, helical-gear hobbing differentially, wormgear hobbing by the infeed method, and wormgear hobbing by the tangential-feed method. Duolineal feeds as herein used means hobbing feeds in one direction and the changing from one feed to another while the hob is in the cut and performing its tooth-generating function in cutting the teeth of gears. And so that full advantage is realized from this new principle of hobbing the invention proposes a novel method and means for changing from one feed (entering feed) to another feed (the normal feed) automatically. A preferred method of effecting the timely shifting from one feed to another is illustrated more particularly in Figs. 8 and 11, the control circuits and instrumentalities being shown more clearly in Figs. 9 and 10 and the actuating dogs in Figs. 4 and 5.

With reference more particularly to Fig. 4 the stanchion 12 mounts a pair of vertically movable trip rods 140 and 141 whose upper ends enter a switch box 142' that contains three switches LS3, LS4, and LS1. The rod 140 carries adjustable dogs 142, 143, 144 and rod 141 carries dogs 145 and 146 which are adapted to be engaged by trip elements 147 and 148, respectively, that are mounted to and travel with the carriage 13. In addition the carriage 13 carries a normally fixed but adjustable trip element 149 that is positioned to actuate a limit switch LS9. The several trip elements are relatively positioned to control automatically the rate and direction of vertical movement of the hob, a typical vertical cycle being as follows:

(1) The operator loads the work W and presses down button to start the hob traversing downwardly until trip element 147 engages trip dog 143 and lowers rod 140 to close switch LS4 whereupon down traverse stops.

(2) The operator pushes the Run button and the main motor starts.

(3) After the hob and work are revolving, the operator pulls out on the feed-clutch lever 150 and the hob enters the work at an entering feed rate. This fast feed continues until the trip element 149 engages and actuates limit switch LS9. By means later to be described the tripping of LS9 stops the enterfeed and causes the hob to continue at the normal feed rate in the same lineal direction until the hobbing of the gear is completed. At this time trip 148 engages preset dog 145 and actuates the rod 141 and thereby limit switch LS1. Actuation of switch LS1 stops the main motor and the power feed.

(4) When the machine stops the work is unloaded the feed-clutch lever 150 is pushed and up-traverse of the slide begins when Up button is pressed, and continues until slide trip 147 engages and lifts dog 144 to actuate limit switch LS3 and stop upward traverse. During the up travel the trips 147 and 149 ride by dog 143 and switch LS9 without effect.

Figure 1:
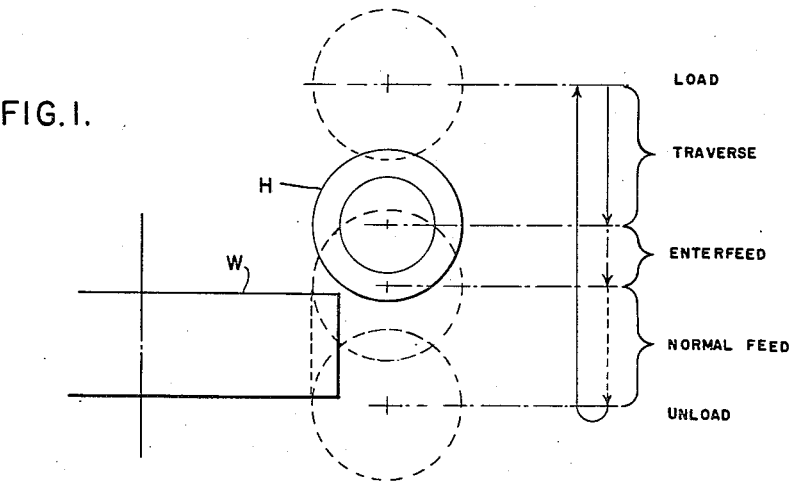
Fig. 1 is a diagrammatic illustration of a duolineal feed cycle as applied to a hob feeding axially of the work.

Should the machine be set up for upfeeding of the hob, the work is loaded when the hob is at the bottom of its travel. The main motor is started, the feed clutch is engaged by lever 150 and the hob enters the work at the enterfeed rate which continues until the slide trip 149 actuates LS9. When LS9 is actuated the enterfeed stops, the normal feed is instituted and the hob continues upfeeding at the normal rate until the slide trip 148 engages preset dog 146 and trips LS1. This stops the main motor and the upfeed. Thereafter the clutch lever 150 is pushed to disengage the feed clutch spool 64, the connecting shaft-driven bevel gears and shifter fork not being shown. Up traverse is started by pushbutton and the slide continues up until the slide trip 147 engages preset dog 144 and actuates LS3 to stop the up travel. The work may then be unloaded and the slide traversed down again to starting position. The vertical-feed movements are illustrated diagrammatically in Fig. 1 for downfeeding using the duolineal-feed principles of this invention. An upfeeding cycle using duolineal feed is similar to Fig. 1 but opposite in direction as will be understood.

*Infeed (wormgear hobbing)*

Figure 2:
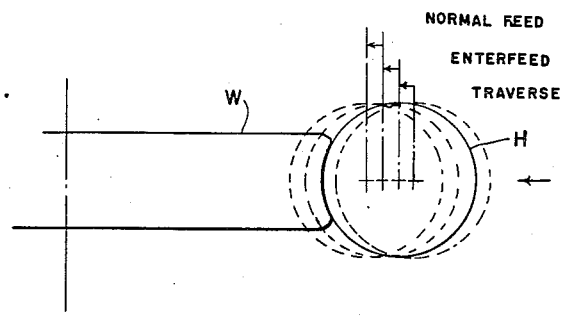
Fig. 2 is a diagrammatic illustration of the duolineal feed as applied to infeed wormgear hobbing.

When hobbing wormgears by the infeed method using duolineal feed, the work is first loaded and the stanchion 12 traversed in to starting position whereat abutment 152 engages LS17 and stops the in traverse. Thereafter the main motor is started, the clutch lever 150 is pulled to engage the feed clutch and the hob moves in at the selected enterfeed rate (see Fig. 2). When abutment dog 153 engages limit switch LS18 the enterfeed stops and the normal feed continues with the hob well into the work, until stanchion-carried limit switch LS8 engages an infeed limiting abutment 154 and the infeed stops. Thereafter the operator disengages feed clutch 64 by means of lever 150 and again presses the Run button so that the work and the hob revolve for cleaning up without feeding after which the rotary motions are stopped and the stanchion caused to traverse out to starting position to permit reloading.

*Tangential feed (wormgear hobbing)*

In using the machine to hob wormgears by the tangential-feed method with duolineal feed, the hob-swivel-head 16 is removed from the slide 13 and a tangential-feed head 100 (Fig. 5) is substituted therefor. Also is utilized the gear housing 101 (shown in dotted lines in Fig. 4) atop the stanchion, housing bevel gears 130 (Fig. 7), parts of the drive 131 across to vertical shaft 25, and a lever operable to disconnect power vertical feed and to connect the tangential feed. For convenience the hob-rotating and feeding attachments are illustrated in dotted lines in Fig. 7 more clearly to show their relationship to the primary transmission that embodies the duolineal-feed gearing.

When the changeover has been made the work W is loaded on the work table and the stanchion positioned and clamped at the correct center distance between hob and work. Assuming that the selected feed direction will be to the right, the hob is tangentially traversed Right until it is in the proper position to commence cutting, when abutment 160 carried by the tangential slide 110 engages trip dog 162 on rod 163 and actuates LS13 to stop the traverse movement. Thereafter the operator pulls out on the feed-clutch lever 150 to engage the power feed clutch 64 and close switch LS2.

Figure 3:
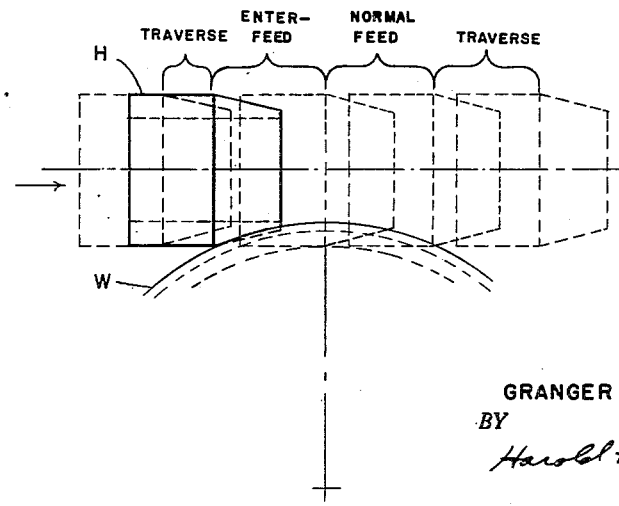
Fig. 3 is a diagrammatic illustration of duolineal feed as applied to tangential-feed wormgear hobbing.

Hob rotation and tangential feeding at an enterfeed rate starts on engaging the feed clutch 64, and the hob continues feeding laterally at the enterfeed rate (see Fig. 3) until adjustable abutment 164 carried by the tangential slide 110 engages and actuates limit switch LS11 which stops the tangential enterfeed and starts the tangential normal feed. Tangential normal feed continues until abutment 165 engages trip dog 166 on rod 167 and actuates LS10 to stop the main motor as well as the normal tangential feed. Thereafter the operator disengages the feed clutch 64 by means of lever 150 and presses traverse Right push-button again to move the hob clear of the work. The finished work W is then unloaded. The Left pushbutton is pushed to traverse slide back to initial loading position, at which point trip dog 162 is actuated by stop 160 riding with slide 110, thereby moving trip rod 163 sufficiently to actuate LS12 and stop the traverse motor. A new workpiece is then loaded into the machine and the cycle repeated.

When the feeding direction is to the left, the cycle is similar except reversed.

The duolineal-feed gearing is illustrated in the schematic gearing arrangement Fig. 7 and in further detail in Fig. 8. In this embodiment it is proposed to effect the shifting of the dual-feed clutch spool 55 pneumatically and control the air supply to and from a power cylinder by means of a solenoid-operated valve. Fig. 11 illustrates diagrammatically a preferred form of system in which 170 represents a source of air under pressure and PS a pressure switch that functions to open the entire electrical control system if the air pressure falls below a predetermined minimum. Air under pressure is led to spring-loaded valve 171 that is normally biased by its spring to the left (in Fig. 11) to direct air under pressure to the underside of a piston 172 in a power cylinder 173. Air discharging from the opposite end of the cylinder passes through line 174 back through the valve to atmosphere. The piston rod 175 of the power cylinder is pivotally connected to one arm 176 of a bell-crank lever whose other end 177 yokes the clutch spool 55 and in the position of the valve shown in Fig. 11, the dual-feed clutch spool 55 is engaged with the clutch teeth on wormgear 53 which provides the normal feed. When, however, the valve solenoid Sol. is energized, air under pressure is directed to the upper end of cylinder 173 and the piston thereof moves out to unclutch normal-feed wormgear 53 and engage the clutch spool with the enterfeed wormgear 61.

*Electrical controls*

The electrical circuits and instrumentalities for controlling the several hobbing cycles hereinbefore explained are illustrated in elementary and diagrammatic form in Figs. 9 and 10. In these figures lines L1, L2, L3 are heavy-duty circuits for the main motor #1 designated M, traverse motor #2 designated T, and coolant motor #3 designated C, each of which is controlled by magnetic starters marked Main, Traverse and Coolant, respectively, the traverse-motor starter being a reversing starter. The switches of the starters are controlled by magnetic coils 1, 2R, 2F, and 3 which are energized by lower voltage of a control circuit that receives power from a transformer 204 connected across lines L1 and L3. The control circuit receives power through a fuse, pressure switch PS, and a main Stop switch 205 all connected in series. An opening of the circuit at any of these points automatically opens all relays and the machine stops operating. From the outgoing side of the Stop switch 205 current is supplied to a Run-Jog button switch 206 and assuming the latter is turned to Run current is supplied through switches marked In, Out, Down-Right, Up-Left, and normally closed switches LS8, LS1, LS10 (plugs 211 connected) to magnetic coil 1 of the main-motor starter. When the main-motor switch M1 closes, a holding circuit M1 is established around the run contacts of the Run switch. Switches In, Out, Down-Right, Up-Left are control switches for the traverse motor and if an attempt is made to use the traverse motor the control circuit of the main motor is interrupted. When the main motor is running the coolant motor is running also for the actuating coil 3 of its starter is in parallel with coil 1 of the main-motor starter unless disconnected by its own Coolant On-Off switch 207. Limit switches LS8, LS1, and LS10 are, respectively, the infeed-limit switch, the vertical-feed-limit switch, and the tangential-feed-limit switch, and when their respective actuating dogs operate such switches, the main drive and coolant motors stop, as previously explained.

The direction of operation of the traverse motor T is controlled by its reversing starter 202 including coils 2R and 2F thereof. The circuits for the forward and reverse coils initiates at the outgoing side of the stop switch 205 and after passing through the normally closed side of LS2 (feed-clutch interlocking switch actuated by lever 150) branches at selector switch LS5 into two circuits. Selector switch LS5 is located in the gearing compartment 14 and functions to render the In and Out stanchion-movement controls ineffective when the Up and Down slide controls or the Right and Left cutter traverse controls are effective. Switch LS5 is actuated to one of its effective positions by means of a manually-operable handle 208 located at the gear housing (Fig. 4). When the selector switch LS5 is thrown to the Up-Left, Down-Right position indicative of hob movements up or down or to the right or left, the In-Out indicative of stanchion movement, is dead so that the stanchion 12 will not move. Assuming the switch LS5 to be closed on the Up-Left, Down-Right position, current is passed to a Traverse Jog-Run switch 209 and to Up-Left, Down-Right switch 210. If switch 209 is moved to Run a pressing of the Up button completes a circuit thru LS3, LS15, to the reverse coil 2R of the traverse-motor starter. On closing of the starter switch a holding circuit is completed thru switch 2R around the pushbutton switch 210. In this circuit to the reverse coil of the starter are switches LS3, LS12 and LS15, the latter two in parallel, and all normally closed. Switch LS3 is actuated to open position when the cutter slide reaches its upper preset position and stops the up-traverse. Switch LS15 is at the top of the column and will have been actuated to closed position by push-pull lever 212 when the tangential head 100 is removed and the swivel head 16 attached to the carriage 13. Switch LS12 is in the tangential-feed circuit and is removed when the disconnect plug 211 is opened.

When it is desired to traverse the slide downwardly, the Down button of switch 210 is pressed and a circuit is completed through LS4 and LS16, to the forward coil 2F of the traverse-motor starter. Switch LS4 is the lower limit switch of the carriage and opens to stop carriage traverse down when the carriage reaches the preset limit. Switch LS16 is at the top of the column and normally closed by push-pull lever 212. Switch LS13 in parallel is in the tangential-feed circuit and would not be in the Up-Down circuit in the absence of the tangential-cutter head.

However, when the tangential head is attached, switches LS12 and LS13 are brought into the circuit (switches LS15 and LS16 will be open) and pressing of the buttons of switches 210 will cause the hob to traverse to the right or to the left as a result of the gearing connections made when the tangential head is applied. For convenience, the buttons of switch 210 are labeled Left and Right in addition to Up and Down because of the double function they perform.

Stanchion traverse movements in and out are controlled by pushbuttons In and Out of switch 213 which receive power from the other side of selector switch LS5. A pressing of the In button completes a circuit through LS6 and LS17 to the forward coil 2F of the starter 201. LS6 limits the extreme In movement of the stanchion and LS17 is the preset limit switch that opens to stop the In traverse just prior to the hob engaging the work. When the Out button of switch 213 is pressed a circuit is completed thru LS7 to the reverse coil 2R of the traverse-motor starter and the stanchion traverses out. Out-traverse continues until the dog 214 engages LS7 and opens the circuit of the coil 2R stopping the traverse motor and stanchion movement.

Power for operating the enterfeed solenoid Sol. is also taken from the outgoing side of the Stop switch 205 and is lead to an Enterfeed Off-On switch 216 (Fig. 9). If this switch 216 is turned to Off the solenoid Sol. cannot be energized and the valve 171 controlled thereby will take up a position as indicated in Fig. 11. With the valve in such a position air under pressure acts upon the underside of piston 172 and movement of the latter moves the clutch spool 55 of the duolineal-feed clutch into engagement with the normal-feed gear 53 (Figs. 7 and 8). When the Enterfeed Off-On switch 216 is turned to On the valve solenoid Sol. may be energized via circuit 217 to shift and hold the valve 171 to the right in Fig. 11 against its spring whereupon pressure air is directed to the top of piston 172 to cause the shifting of the duolineal-feed clutch spool 55 into mesh with feed gear 61 and produce the enterfeed movement, provided, of course, relay switch CR1 in the solenoid circuit is closed.

Relay switch CR1 is controlled by its coil CR1 in a parallel circuit 218 which includes interlocking circuits and switches adapted to not only to effect timely operation of the solenoid valve and the duolineal-feed clutch but to prevent operation thereof that can or may be incompatible with other machine functions. The CR1 relay circuit 218 leads first to switch LS2 which is actuated to closed position by and through actuation of main feed-clutch lever 150 to engage the power feed. If clutch lever 150 is pushed to stop-feed position, switch LS2 in the coil circuit opens and de-energizes the relay CR1. When that occurs the valve shifts by spring pressure and the duolineal-feed clutch shifts to normal-feed position. However, with LS2 closed, the current may flow in any one of three branching lines 219, 220, and 221. Line 219 embodies the normally open side of switch LS5 (Up-Down, In-Out selector switch actuated by handle 208), also switch LS16 (tangential-feed attachment switch at the top of the column actuated by push-pull lever 212) and also the normally open side of switch LS4 located at the side of the column and which is actuated by the vertical movement of the carriage 13. Switch LS5 will close on actuation of selector handle 208 to the proper position for a vertical cycle, LS16 will be closed in the absence of the tangential-feed attachment, and LS4 in the CR1 circuit will close to effect the enterfeed movement when latch 147 on the slide 13 engages dog 143 and actuates switch LS4 at the end of the preset traverse movement. This operation stops the traverse and starts enterfeed. Around switch LS4 is a holding circuit including normally closed switch LS9 (on the stanchion) and relay switch CR1. Relay switch CR1 closes on energization of its relay coil CR1, and the slide latch 147 may therefor ride by trip dog 143. However, at the preset limit of the enterfeed travel, dog 149 on the carriage 13 engages switch LS9 and opens the circuit to relay coil CR1. De-energization of relay CR1 opens the switch CR1 in the circuit to the solenoid Sol. and the valve 171 shifts to normal-feed position. Thus the hob travel starts at a traverse rate and moves toward the work but before reaching the work stops automatically. Power feed is engaged and the hob enters the work at enterfeed rate and continues feeding at the faster-than-normal rate until full-cutting depth is reached and then shifts automatically into the normal-feed rate of travel until the hobbing of the gear is completed. The time saved in hobbing the smaller sectional areas of the gear-tooth space at a faster rate than the larger sectional areas with the change made in the cut is indeed substantial.

The branch circuit 220 governs the automatic shifting from enterfeed to normal feed when the machine is set up for hobbing wormgears by the infeed method. This circuit includes the normally closed side of selector switch LS5 (controlled by handle 208) normally closed limit switch LS18 and normally open switch LS17 (mounted on the base and actuated by dog 152). When the stanchion has been moved in by the traverse motor to the point whereat the hob is about to enter the work, dog 152 engages LS17 and in-traverse stops. When main-feed clutch lever 150 is pulled to engage the power feed, switch LS2 closes and completes a circuit through normally closed LS18 to the relay coil CR1 and switch CR1 closes in the holding circuit around LS17. Trip dog 152 may then ride by LS17 and the latter opens. The energization of relay CR1 causes the solenoid Sol. to respond to shift valve 171 against its spring and pressure air is directed to the power cylinder 173 and the latter shifts the duolineal-feed clutch to enterfeed position. When the hob has been fed at the enterfeed rate the preset distance dog 153 on the stanchion engages and opens LS18 and deenergizes relay CR1. When CR1 is de-energized the valve solenoid Sol. is de-energized and the valve shifts to normal-feed position, and the hob continues infeeding at the normal rate of feed.

The third branch circuit 221 to valve-solenoid control relay CR1 governs the timely change from enterfeed to normal feed when the tangential-feed head is applied. This circuit includes push-pull switch LS14 at the top of the stanchion, and switches LS11, LS12, and LS13 on the tangential-feed head, the latter three switches being in the circuit only when the tangential head is attached and disconnect plug 211 is closed. Switch LS14 will be closed by means of push-pull lever 212 and when the hob has been traversed tangentially to a point about to engage the work, switch LS13 in the traverse motor circuit opens (stopping hob traverse) and switch LS13 in the circuit 221 to relay CR1 closes. When the operator pulls feed-clutch lever 150, switch LS2 closes and completes the circuit to relay CR1. Thereupon valve solenoid Sol. is energized, the valve 171 shifts, the duolineal-feed clutch is shifted to enterfeed position, and the hob feeds tangentially into the work at a faster-than-normal feed rate. Energization of relay CR1 also completes a holding circuit through CR1 and limit switch LS11 connected around LS13, thus allowing latch 160 to ride by the adjustable dog 162 that actuated limit switch LS13. The hob continues feeding at the enterfeed rate until adjustable dog 164 on the hob carriage engages and opens limit switch LS11.

The opening of the holding circuit controlled by LS11, opens the circuit to relay CR1 and de-energizes the valve solencid Sol. Consequently the valve 171 shifts by spring pressure to the left and air is directed to the power cylinder 173 causing the duolineal-feed clutch 55 to move from enterfeed position to normal-feed position. Thereafter the hob continues feeding laterally (toward the right in Fig. 5) at its normal rate of feed until the gear is completely hobbed at which time the tangential-slide abutment 165 engages adjustable dog 166 on rod 167 and actuates limit switch LS10. Limit switch LS10 is in the main-motor control circuit and an opening thereof opens the circuit to the coil 1 of the main-motor-starter switch and the hob feed and all rotary motions stop. The final operation consists in unloading the work and traversing the hob tangentially back to the position ready for the next cut.

Automatic feed of the hob tangentially toward the left (in Fig. 5) is controlled in a similar manner except that limit switch LS12 will be actuated by the tangential-slide latch 160 to stop hob traverse just before the work is engaged. Limit switch LS12 is in parallel with limit switch LS13 and controls the relay CR1 in a similar manner. The use of two such switches in parallel circuits makes it possible to employ a one-way-acting adjustable dog on rod 163 for each direction of hob movement. It will also be noted that the limit switch LS10 in the main-motor starter circuit (to coil 1) is in the circuit of disconnect plug 211 and the latter must be connected before any tangential power-feed movements can be instituted.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. In a hobbing machine having a rotatable hob spindle and a rotatable work spindle and means for imparting rotary movements to said spindles, said spindles being mounted for translatory movement relative to one another the combination of, a first transmission operative to effect relative translatory movement between the spindles at a traverse rate faster than usable for an actual hobbing operation, a second transmission for effecting relative translatory movement between said spindles at a feed rate appropriate for a hobbing operation, said second transmission including a first set of gears adapted when effective to yield a hobbing-feed movement at an enterfeed rate and a second set of gears adapted when effective to impart a hobbing-feed movement at a normal feed rate, and means electively operable to render but one of said sets of feed gears effective at any one time, said first and said second set of gears being operative to effect the relative translatory movement in a common lineal direction.

2. The combination of claim 1 including means responsive to relative translatory movement between said spindles in one direction to render said first transmission ineffective prior to commencing a hobbing operation and to condition said second transmission for operation, and means also responsive to relative translatory movement between the spindles when the second transmission is effective to effect a change from one of said hobbing-feed movements to the other of said hobbing feed movements, said change in feed rate being caused to occur during the hobbing operation.

3. In a hobbing machine having a rotatable hob spindle and a rotatable work spindle and means for imparting rotary movements to said spindles the combination of, means for effecting translatory movements between the hob spindle and the work spindle comprising a first transmission operative to effect relative translatory movement between the spindles at a traverse rate faster than usable for an actual hobbing operation, a second transmission for effecting relative movement between said spindles at a feed rate appropriate for a hobbing operation, said second transmission including a first set of gears adapted when effective to yield a feed movement at an enterfeed rate and a second set of gears adapted when effective to impart a feed movement at a normal feed rate, means for changing the speed ratio of said gear sets whereby to vary the resulting speed differential between enterfeed and normal feed, means interlocking said first and second transmissions to prevent incompatible operation thereof, and means responsive to said relative movement between the spindles when the second transmission is effective to change from one of said hobbing feed movements to the other of said hobbing feed movements, said change in feed rate being caused to occur during the hobbing operation and in a common lineal direction.

4. In an all-geared differential gear-hobbing machine having a work spindle adapted to mount a blank to be hobbed and a hob mounted for translatory movement relative to the blank the combination of, a rapid traverse transmission operative to bring the work and the hob into position about to begin a tooling operation and a feed transmission operative to effect relative translatory movement between the hob and the work during the performance of the hobbing operation, said feed transmission including gearing operative to effect the relative movement at an enterfeed rate for a portion of the actual hobbing operation and additional gearing operative to effect the relative movement in the same lineal direction at a normal feed rate for another portion of the actual hobbing operation, and means responsive to the relative translatory movement between the hob and the blank to render the enterfeed gearing ineffective and the normal-feed gearing effective during the hobbing of the blank.

5. In an all-geared nondifferential gear-hobbing machine set up for hobbing spur gears said machine having rotary and relatively translatory hob and work spindles adapted respectively to mount a hob and a work blank the combination of, a rapid traverse transmission operative to bring the work spindle and the hob spindle into position whereat the hob is about to begin a tooling operation, a feed transmission operative to effect relative translatory movement between the hob and the work blank during the performance of a hobbing operation, said feed transmission including gearing operative to effect the relative feed movement at an enterfeed rate for a portion of the hobbing operation and additional gearing operative to effect the relative feed movement in the same lineal direction at a normal feed rate for another portion of the hobbing operation, means responsive to the relative movement between the hob and the work to effect a change from the enterfeed gearing to the normal feed gearing during the hobbing operation to thereby effect a reduction in total hobbing time required to hob a given spur gear.

6. The combination of claim 5 including means operative to render said traverse transmission and the two different feeds of said feed transmission mutually exclusive in their operation.

7. The combination of claim 5 including change gears interposed in the said feed transmission between the first named gearing and the second named gearing therein for changing the ratio between the enterfeed and the normal feed rates.

8. In a gear-hobbing machine having a rotatable hob spindle adapted to carry a hob a rotatable work spindle adapted to support a workpiece to be operated upon by the hob, and means mounting said hob spindle and said work spindle for bodily movement relative to one another so as to effect a hobbing operation, the combination of a hob-spindle driving transmission connected with the hob spindle for rotating same and a work-spindle driving transmission connected with the said hob-driving transmission and with the said work spindle for rotating the work spindle in timed relation with the rotary movement imparted to the hob spindle and a feed transmission connected with one of said spindles for effecting a feed movement of the one relative to the other at a rate compatible with the capacity of the hob to perform a tooling operation on the workpiece, said feed transmission including a first means electively operable to impart a feed movement at a first selected tooling rate and a second means electively operable to the exclusion of said first means to impart a feed movement in the same direction at a second selected tooling rate, and an additional transmission connected with said feed transmissions for effecting relative movement between said spindles at a traverse rate incompatible with the capacity of the hob to perform a tooling operation on the work, said additional transmission including clutch means and controls therefor operative when actuated to render said additional transmission effective to produce relative movement between the said spindles when the hob is not actually tooling the workpiece.

9. In an all-geared nondifferential gear-hobbing machine set up for hobbing spur gears said machine having rotary and relatively translatory hob and work spindles adapted respectively to mount a hob and a work blank the combination of, a rapid-traverse transmission adapted when operated to bring the work spindle and the hob spindle into position whereat the hob is about to begin a tooling operation, a feed transmission operative to effect relative feed movement between the hob and the work blank for and during the actual hobbing operation on the blank, said feed transmission including gearing operative to effect the relative feed movement to cause the hob to enter the blank at an enterfeed rate and to continue at said enterfeed rate for a portion of the actual hobbing operation and additional gearing operative to continue the relative movement in the same lineal direction at a different feed rate for another portion of the actual hobbing operation, and means responsive to the relative movement between the hob and the work to effect a change from one hobbing feed rate to the other.

10. In a hobbing machine having a rotatable hob spindle and a rotatable work spindle and means for imparting rotary movements to said spindles, said spindles being mounted for translatory movement relative to one another the combination of, a first transmission operative to effect relative translatory movement between the spindles at a traverse rate faster than usable for an actual hobbing operation, a second transmission for effecting relative translatory movement between said spindles at a feed rate appropriate for a hobbing operation, said second transmission including feed means adapted to effect relative movement between said spindles at a selected rate of feed suitable for a hobbing operation and feed means adapted to effect relative movement between said spindles at another selected rate of feed suitable for a hobbing operation, and means for rendering said feed means operative sequentially and in a common lineal direction.

11. In a hobbing machine having a rotatable hob spindle and a rotatable work spindle and means for imparting rotary movements to said spindles the combination of, means for effecting translatory movements between the hob spindle and the work spindle electively axially, radially and tangentially, comprising a first transmission operative to effect relative translatory movement between the spindles in any of the said directions at a traverse rate faster than usable for an actual hobbing operation, a second transmission for effecting relative movement between said spindles in any of said directions at a feed rate appropriate for a hobbing operation, said second transmission including means electively operable for effecting the said feed movement in any of said directions at one of at least two different rates of feed suitable for the actual hobbing operation, and means responsive to the relative feed movement between the spindles to effect a change in the rate of relative feed movement from one of said one of at least two different feed rates to another one thereof, said change in feed rate being caused to occur during the hobbing operation and in the same direction in any of said elective directions.

References Cited in the file of this patent

UNITED STATES PATENTS 2,374,254    Zimmermann    Apr. 24, 1945
2,684,016    Staples    July 20, 1954

UNITED STATES PATENT OFFICE

CERTIFICATE OF CORRECTION

Patent No. 2,837,010                                                          June 3, 1958

Granger Davenport

It is hereby certified that error appears in the printed specification of the above numbered patent requiring correction and that the said Letters Patent should read as corrected below.

Column 1, line 49, for "efficient" read — inefficient —.

Signed and sealed this 23rd day of September 1958.

(SEAL)
Attest:

KARL H. AXLINE
Attesting Officer

ROBERT C. WATSON
Commissioner of Patents